United States Patent
Tamai et al.

(10) Patent No.: US 7,503,877 B2
(45) Date of Patent: Mar. 17, 2009

(54) TURBINE OFFSET MATCHING CONTROL SYSTEM

(75) Inventors: Goro Tamai, West Bloomfield, MI (US); Birendra P. Bhattarai, Novi, MI (US); William L. Aldrich, III, Davisburg, MI (US); James L. Worthing, Munith, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 270 days.

(21) Appl. No.: 11/471,461

(22) Filed: Jun. 20, 2006

(65) Prior Publication Data

US 2007/0293368 A1    Dec. 20, 2007

(51) Int. Cl.
*B60W 10/06*    (2006.01)
*B60W 10/02*    (2006.01)

(52) U.S. Cl. .................................. 477/169; 477/181
(58) Field of Classification Search ............. 477/84, 477/85
See application file for complete search history.

(56) References Cited

U.S. PATENT DOCUMENTS

| 5,141,089 | A | * | 8/1992 | Nobumoto et al. .......... 477/169 |
| 6,780,140 | B2 | | 8/2004 | Okamoto et al. |
| 7,089,102 | B2 | * | 8/2006 | Slayton et al. ............... 701/51 |

* cited by examiner

*Primary Examiner*—Sherry L Estremsky
*Assistant Examiner*—Edwin A Young

(57) ABSTRACT

A control system for enabling an engine to operate in a deceleration fuel cutoff (DFCO) mode is provided. The system includes: an enable module that selectively enables a DFCO mode based on an accelerator pedal position; and an engine speed module that regulates engine speed based on turbine speed during a predetermined time period after the DFCO mode is enabled.

18 Claims, 3 Drawing Sheets

TURBINE OFFSET MATCHING CONTROL SYSTEM

FIELD

The present disclosure relates to methods and systems for controlling an engine and more particularly to methods and systems for enabling a deceleration fuel cutoff operating mode of the engine.

BACKGROUND

The statements in this section merely provide background information related to the present disclosure and may not constitute prior art.

Automatic transmissions use a fluid clutch known as a torque converter to transfer engine torque from the engine to the transmission. The torque converter operates through hydraulic force provided by pressurized fluid from the automatic transmission. The torque converter multiplies engine torque and directs it through the transmission.

A conventional torque converter includes a sealed chamber filled with hydraulic fluid. The chamber includes a pump (or impeller) driven by the engine, a turbine connected to an output shaft, and a stator that provides torque multiplication. A torque converter is said to "slip" when the impeller speed and the turbine speed are not equivalent. Some converters incorporate a lockup mechanism such as a mechanical clutch that engages at cruising speeds to physically link the impeller with the turbine. The physical link causes the impeller and the turbine to rotate at the same or near the same speed, thereby reducing or eliminating slip. The clutch is applied and released via fluid supplied through a hollow shaft at the center axis of the rotating converter assembly.

In some applications, the engine may employ a deceleration fuel cutoff device that is capable of operating the engine in a deceleration fuel cutoff (DFCO) mode. Operating in a DFCO mode is desirable during overrun conditions (i.e., going down a hill) or in city traffic, as well as for engine speed limitation purposes. Operation in the DFCO mode contributes to improved fuel economy.

In order to enter the DFCO mode, it is desirable for the torque converter clutch to be applied. This reverses the transfer of torque. More specifically, the applied clutch allows torque to be transferred from rotating drive wheels back to the engine crankshaft when the vehicle coasts. If the slip across the torque converter is too high or too low prior to entering the DFCO mode, the application of the torque converter clutch may be delayed or may not occur at all. Hence, delaying or preventing the engine from operating in the DFCO mode and thus, impacting fuel economy.

SUMMARY

Accordingly, a control system for enabling an engine to operate in a deceleration fuel cutoff (DFCO) mode is provided. The system includes: an enable module that selectively enables a DFCO mode based on an accelerator pedal position; and an engine speed module that regulates engine speed based on turbine speed during a predetermined time period after the DFCO mode is enabled.

In other features, a method for enabling a deceleration fuel cutoff mode of an internal combustion engine is provided. The method includes: receiving a deceleration fuel cutoff (DFCO) request wherein the DFCO request is initiated based on an accelerator pedal position; controlling engine speed based on turbine speed after receiving the DFCO request; applying a torque converter clutch when the engine speed is within a predetermined range of the turbine speed; and enabling the DFCO mode after the clutch is applied.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
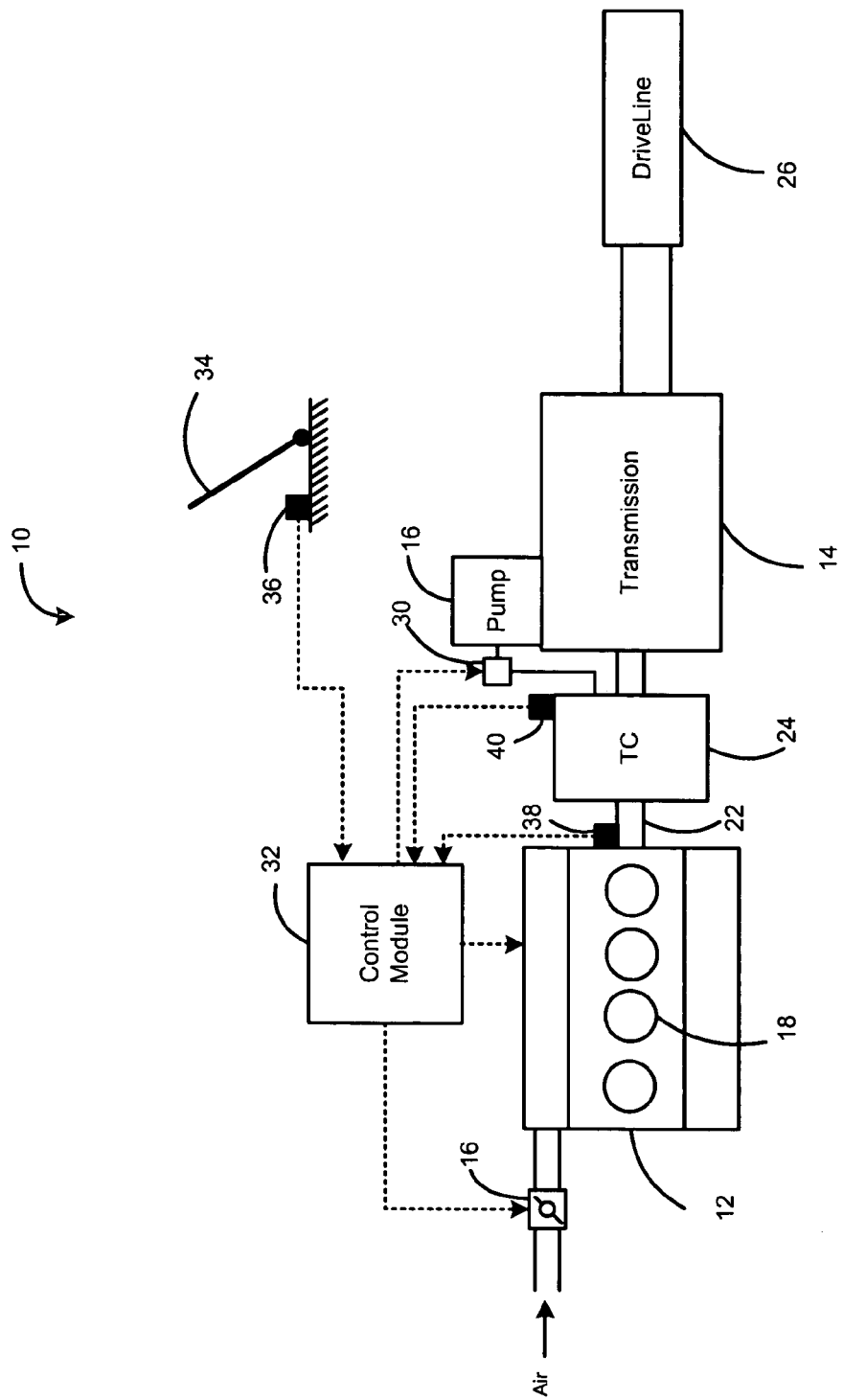
FIG. 1 is a functional block diagram of a vehicle including a conventional torque converter system.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring to FIG. 1, a vehicle 10 includes an engine 12 that drives a transmission 14. Air flows into the engine 12 through a throttle 16. Fuel is combined with the air to be combusted within cylinders 18. The combustion process reciprocally drives pistons (not shown) within the cylinders 18. The pistons rotatably drive a crankshaft 22 to produce drive torque. The engine 12 includes N cylinders 18. Although FIG. 1 depicts four cylinders (N=4), it is appreciated that the engine 12 may include additional or fewer cylinders 18. For example, engines having 4, 5, 6, 8, 10, 12 and 16 cylinders are contemplated.

Torque from the engine 12 is supplied to the transmission 14 through a torque converter (TC) 24. The torque converter 24 may be any known lockup converter including a turbine, a stator, and a torque converter clutch (TCC). The transmission 14 multiplies the drive torque generated by the engine 12 through one of a plurality of gear ratios to drive a vehicle driveline 26. The transmission 14 includes a hydraulic pump 28 that regulates pressurized fluid within the transmission 14 and controls fluid flow to and from the TC 24 via at least one solenoid-operated valve 30.

An engine speed sensor 38 generates an engine speed signal based on a rotational speed of the crankshaft 22. A turbine speed sensor 40 generates a turbine speed signal based on a rotational speed of the turbine within the torque converter 24. The control module receives the signals and commands a current and/or pulse width modulated signal to the solenoid 30 in order to vary the supply of pressurized fluid to the torque converter 24. The control module 32 controls a slip rate of the TC 24 by varying the pressurized fluid.

A vehicle operator manipulates an accelerator pedal 34 to regulate the throttle 16. A pedal position sensor 36 senses the position of the accelerator pedal 34 and generates a pedal position signal that is communicated to the control module 32. The control module 32 generates a throttle control signal based on the pedal position signal. A throttle actuator (not shown) adjusts the throttle 16 based on the throttle control signal to regulate air flow into the engine 12. Such method of controlling the throttle 16 is referred to as electronic throttle control (ETC). The control module 32 adjusts fuel quantity and generates a fuel signal to the engine 12 based on the air flow.

When the pedal position signal indicates that the pedal 34 has been released and the vehicle is operating in a coast mode, the control module 32 communicates with the engine 12 and various sensors and actuators to control the activation of a deceleration fuel cutoff (DFCO) mode. In order to smooth the transition into the DFCO mode, the control module 32 controls the throttle 16 based on engine speed, turbine speed, and a turbine offset matching method and system according to the present disclosure.

More particularly, the control module 32 determines when the DFCO mode is desired and controls the throttle 16 and fuel such that the engine speed is equal to the turbine speed plus a predetermined offset. Controlling the engine speed to be within a predetermined range of the turbine speed allows for the torque converter clutch to be applied. Once the torque converter clutch is applied, the DFCO mode is enabled thereby disabling fuel to the engine 12. Thereafter, the transmission 14 backdrives the unfueled engine 12 through the torque converter 24 to maintain a default engine speed.

Figure 2:
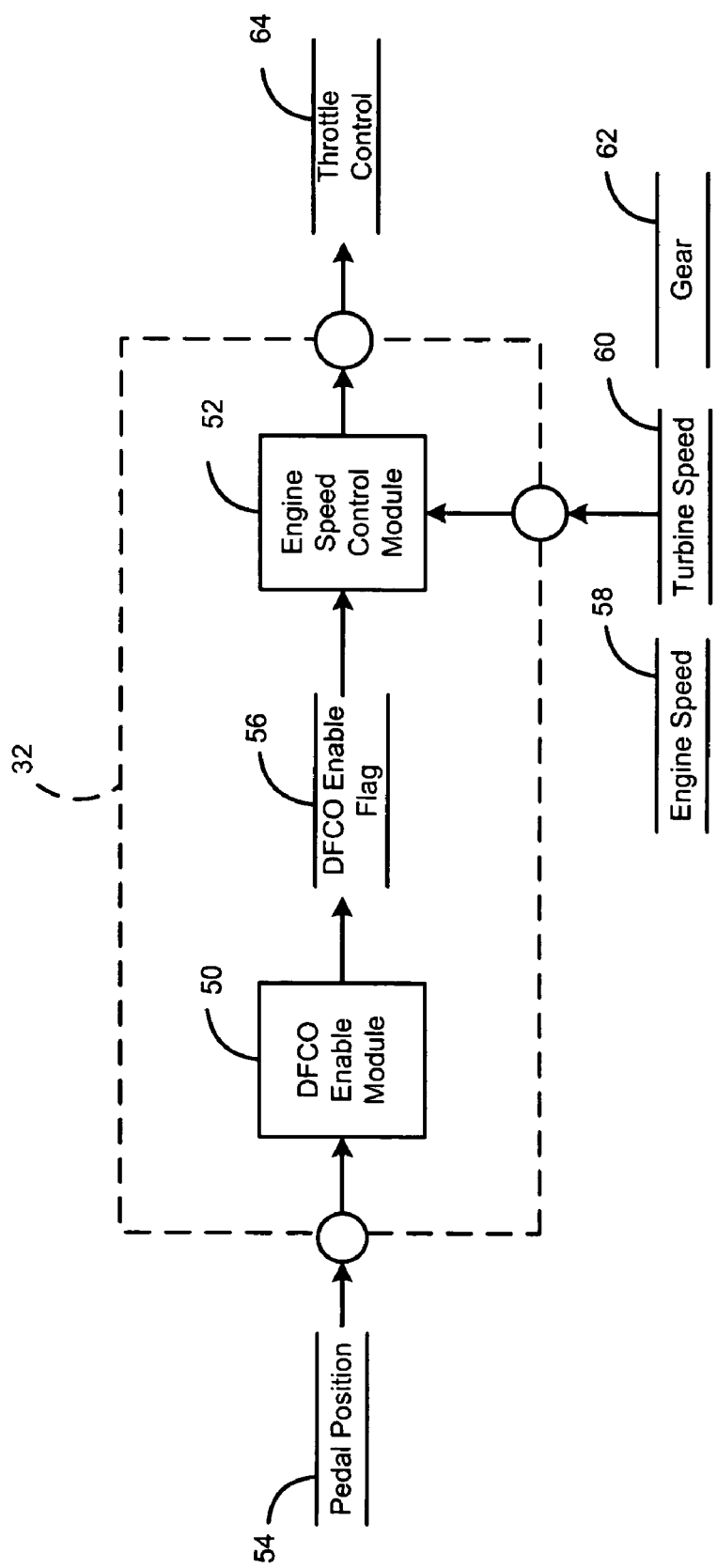
FIG. 2 is a dataflow diagram illustrating a turbine offset matching control system.

Referring to FIG. 2, a dataflow diagram illustrates various embodiments of a turbine offset matching system that may be embedded within the control module 32. Various embodiments of turbine offset matching systems according to the present disclosure may include any number of sub-modules embedded within the control module 32. The sub-modules shown may be combined and/or further partitioned to similarly control the engine during activation of the DFCO mode. Inputs to the system may be sensed from the vehicle 10, received from other control modules (not shown) within the vehicle 10, and/or determined from other sub-modules within the control module 32. In various embodiments, the control module 32 of FIG. 2 includes a DFCO enable module 50 and an engine speed control module 52.

The DFCO enable module 50 receives as input the accelerator pedal position 54. Based on the accelerator pedal position 54, the DFCO enable module 50 selectively sets a DFCO enable flag 56. The DFCO enable flag 56 is set to TRUE when the accelerator pedal position 54 indicates that an accelerator pedal tip-out has occurred (e.g., the operator has released the pedal 34 (FIG. 1)). Otherwise the DFCO enable FLAG 56 remains set to FALSE. The engine speed control module 52 receives as input the DFCO enable flag 56, engine speed 58, turbine speed 60, and gear 62. When the DFCO enable flag 56 is TRUE, the engine speed control module 52 controls a desired engine speed to be nearly the same as the turbine speed. In various embodiments the desired engine speed is controlled to be near the turbine speed plus a predetermined offset. More particularly, the engine control module 52 controls the throttle 16 (FIG. 1) via a throttle control signal 64 as a function of gear 62 and engine speed 58 such that the desired engine speed is achieved. The throttle 16 is controlled for a predetermine time period. Once the time period expires, the desired engine speed is gradually adjusted back to a default value and the throttle is controlled via the throttle control signal 64 accordingly.

Figure 3:
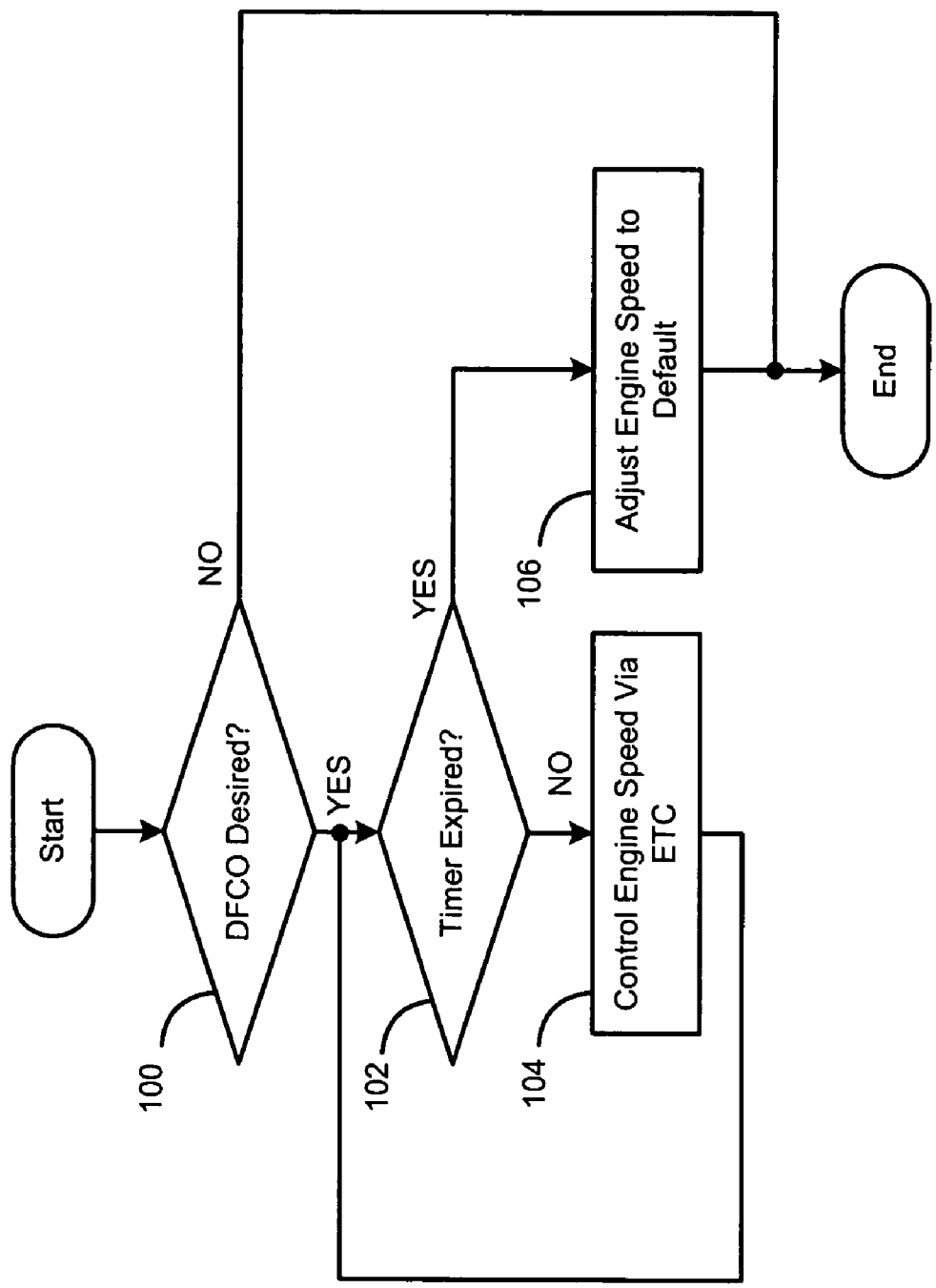
FIG. 3 is a flowchart illustrating a turbine offset matching control method.

Referring now to FIG. 3, a method of turbine offset matching for deceleration fuel cutoff is shown. The method can be run continually during engine operation. DFCO enable conditions are evaluated at 100. If the DFCO mode is desired at 100, control evaluates a timer at 102. If a time since accelerator pedal tip-out has not expired at 102, engine speed is controlled via the ETC at 104. More particularly, the throttle is controlled based on gear and current engine speed such that the ultimate engine speed is near the turbine speed plus a predetermined offset (e.g., 100 RPM). Control continues to control the engine speed via the throttle at 104 until the timer expires at 102. When the timer expires at 102, the throttle is controlled back to a default value at 106.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A control system for enabling an engine to operate in a deceleration fuel cutoff (DFCO) mode, comprising:
    an enable module that selectively enables a DFCO mode based on an accelerator pedal position; and
    an engine speed module that regulates engine speed based on a torque converter turbine speed during a predetermined time period after the DFCO mode is enabled.

2. The system of claim 1 wherein the engine speed module regulates engine speed by commanding a throttle signal based on the torque converter turbine speed.

3. The system of claim 1 wherein the engine speed module regulates engine speed based on the torque converter turbine speed and a predetermined offset.

4. The system of claim 1 wherein the enable module enables the DFCO mode when the accelerator pedal position indicates the pedal is released.

5. The system of claim 1 wherein the engine speed module regulates engine speed for the predetermined time period and thereafter, the engine speed module gradually adjusts engine speed to a default speed.

6. The system of claim 5 wherein the predetermined time period is based on the accelerator pedal position.

7. The system of claim 1 further comprising:
    a torque converter clutch control module that controls pressurized fluid to the clutch to apply the clutch when engine speed is within a predetermined range of the torque converter turbine speed; and
    a fuel control module that disables fuel after the torque converter clutch is applied.

8. The system of claim 1 wherein the engine control module controls engine speed as a function of current engine speed and gear.

9. A method for enabling a deceleration fuel cutoff mode of an internal combustion engine, comprising:
    receiving a deceleration fuel cutoff (DFCO) request wherein the DFCO request is initiated based on an accelerator pedal position;
    controlling engine speed based on a torque converter turbine speed after receiving the DFCO request;
    applying a torque converter clutch when the engine speed is within a predetermined range of the torque converter turbine speed; and
    enabling the DFCO mode after the clutch is applied.

10. The method of claim 9 further comprising stopping fuel injection once the DFCO mode is enabled.

11. The method of claim 9 wherein the controlling comprises controlling engine speed to be within a predetermined range defined by the torque converter turbine speed and a predetermined offset.

12. The method of claim 9 wherein the controlling comprises controlling engine speed to be equal to the torque converter turbine speed plus a predetermined offset.

13. The method of claim 9 wherein the controlling engine speed is performed for a predetermined time period.

14. The method of claim 13 wherein the predetermined time period is initiated based on the accelerator pedal position.

15. The method of claim 13 further comprising adjusting engine speed to a default speed after the predetermined time period expires.

16. The method of claim 9 wherein the controlling further comprises controlling engine speed by commanding a throttle to adjust airflow to achieve an engine speed within the predetermined range of the torque converter turbine speed.

17. The method of claim 9 wherein the controlling further comprises controlling engine speed by commanding a throttle to adjust airflow to achieve an engine speed equal to the torque converter turbine speed plus a predetermined offset.

18. The method of claim 9 wherein the controlling further comprises controlling engine speed as a function of current engine speed and gear.

\* \* \* \* \*